(12) United States Patent
Ide et al.

(10) Patent No.: US 7,458,088 B2
(45) Date of Patent: *Nov. 25, 2008

(54) INTERMEDIATE FOR OPTICAL RECORDING MEDIUM AND METHOD OF MANUFACTURING THE OPTICAL RECORDING MEDIUM

(75) Inventors: Junichi Ide, Tokyo (JP); Mamoru Usami, Tokyo (JP); Tomoki Ushida, Tokyo (JP); Kenji Yamaga, Tokyo (JP); Atsushi Koyama, Tokyo (JP)

(73) Assignee: TDK Corporation, Tokyo (JP)

( * ) Notice: Subject to any disclaimer, the term of this patent is extended or adjusted under 35 U.S.C. 154(b) by 770 days.

This patent is subject to a terminal disclaimer.

(21) Appl. No.: 10/518,388

(22) PCT Filed: Jul. 2, 2003

(86) PCT No.: PCT/JP03/08450

§ 371 (c)(1),
(2), (4) Date: Dec. 30, 2004

(87) PCT Pub. No.: WO2004/006237

PCT Pub. Date: Jan. 15, 2004

(65) Prior Publication Data

US 2006/0072431 A1 Apr. 6, 2006

(30) Foreign Application Priority Data

Jul. 5, 2002 (JP) ............................. 2002-196644

(51) Int. Cl.
*G11B 7/24* (2006.01)
(52) U.S. Cl. .................................... 720/724
(58) Field of Classification Search ................. 720/724; 369/272.1, 275.1, 283, 280, 275.5; 264/1.33
See application file for complete search history.

(56) References Cited

U.S. PATENT DOCUMENTS 6,779,193 B2 * 8/2004 Boissonneault et al. ..... 720/720

(Continued)

FOREIGN PATENT DOCUMENTS

JP 2000-331377 11/2000

(Continued)

OTHER PUBLICATIONS

English language Abstract of JP 2001-167472.

(Continued)

*Primary Examiner*—Allen T Cao
(74) *Attorney, Agent, or Firm*—Greenblum & Bernstein, P.L.C.

(57) ABSTRACT

An intermediate for an optical recording medium, according to the present invention, is an intermediate produced beforehand for manufacturing an optical recording medium that has a central mounting hole formed in a central portion thereof and one or more kinds of functional layers formed on a surface thereof, for enabling at least one of information recording and information reproduction. The intermediate has a provisional central hole, which is smaller in diameter than the central mounting hole, formed in a central portion thereof. This makes it possible to drop resin in the vicinity of the center of the intermediate without using a disk-shaped member, in performing spin coating on the intermediate, whereby it is possible to make the layer of applied resin substantially uniform in thickness.

7 Claims, 5 Drawing Sheets

U.S. PATENT DOCUMENTS

| | | | |
|---|---|---|---|
| 6,898,796 B2 * | 5/2005 | Komaki et al. | 720/724 |
| 7,138,165 B2 * | 11/2006 | Koyama et al. | 428/64.4 |
| 2001/0043555 A1 | 11/2001 | Hisada et al. | |
| 2003/0161255 A1 | 8/2003 | Kikuchi et al. | |
| 2005/0001343 A1 * | 1/2005 | Komaki et al. | 264/1.33 |

FOREIGN PATENT DOCUMENTS

| | | |
|---|---|---|
| JP | 2001-167472 | 6/2001 |
| JP | 2002-170279 | 6/2002 |
| JP | 2002-184037 | 6/2002 |

OTHER PUBLICATIONS

English language Abstract of JP2000-331377.

* cited by examiner

F I G. 1 5
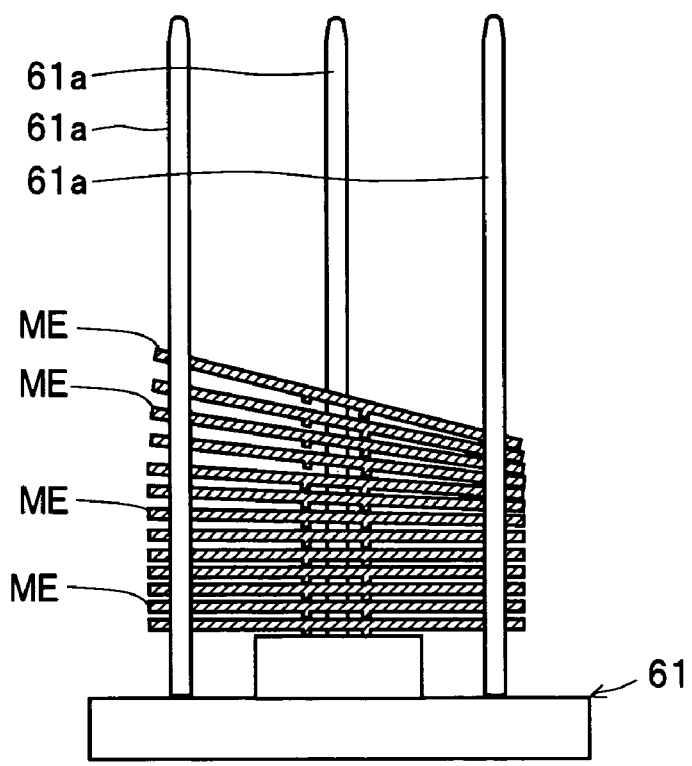

INTERMEDIATE FOR OPTICAL RECORDING MEDIUM AND METHOD OF MANUFACTURING THE OPTICAL RECORDING MEDIUM

TECHNICAL FIELD

The present invention relates to an intermediate for an optical recording medium, for manufacturing an optical recording medium that has a central mounting hole formed in a central portion thereof and one or more kinds of functional layers formed on a surface thereof, for enabling at least one of information recording and information reproduction, and a method of manufacturing the optical recording medium using the intermediate.

BACKGROUND ART

Conventionally, in a method of manufacturing an optical recording medium of the above-mentioned kind (such as a CD (Compact Disk) or a DVD (Digital Versatile Disk), first, a disk-shaped substrate DP having a shape shown in FIG. 9 is molded by injecting resin into a mold having a stamper set therein. In this step, a central mounting hole (also used as a central mounting hole of the optical recording medium) MH is formed in the central portion of the disk-shaped substrate DP. Further, fine protrusions/depressions (not shown) such as grooves are formed in an area (recording area RA) of one surface (upper surface as viewed in the figure) of the disk-shaped substrate DP, where functional layers, referred to hereinafter, are to be formed. Furthermore, an annular projection (so-called stock ring) SR is formed on the other surface (lower surface as viewed in the figure) of the disk-shaped substrate DP. The annular projection SR is formed in a zone between a chucking area CA adjacent to the central mounting hole MH toward the inner periphery of the disk-shaped substrate DP and the recording area RA. As shown in FIG. 11, molded disk-shaped substrates DP are stored in a state stacked on a stacker 51 with the central mounting hole MH of each disk-shaped substrate DP being fitted on a stacker pole 51a of the stacker 51. In this case, the disk-shaped substrates DP are stacked with spaces created therebetween by the annular projections SR. Therefore, even if vibrations are applied to the disk-shaped substrates DP in this state, the disk-shaped substrates DP are prevented from being greatly inclined, so that interference between the disk-shaped substrates DP can be avoided, which prevents the surfaces of the disk-shaped substrates DP from being damaged or flawed.

Then, the disk-shaped substrates DP are sequentially taken out from the stacker 51, and various functional layers (reflection layer, recording layer, protective layer, etc.) are sequentially formed in the recording area RA of the one surface of each disk-shaped substrate DP to thereby complete an optical recording medium (not shown). Thereafter, the completed optical recording media are stored on the stacker 51 similarly to the disk-shaped substrates DP. In the step of forming the functional layers, part of the functional layers (e.g. the protective layer) is formed by applying resin by the spin coating method and then curing the applied resin by a predetermined curing treatment. In doing this, as shown in FIGS. 9 and 10, a method is employed which applies resin R using a disk-shaped member DI, because this method facilitates formation of functional layers (resin layers) substantially uniform in thickness particularly in radial directions. In this method, as shown in FIG. 9, the disk-shaped member DI is placed on a disk-shaped substrate DP such that the member DI covers the central mounting hole MH, and then the resin R is dropped from a nozzle NZ onto the disk-shaped member DI for spin coating. Thereafter, as shown in FIG. 10, the disk-shaped member DI is removed from the disk-shaped substrate DP, and the disk-shaped substrate DP coated with the resin R up to the outer periphery of the upper surface thereof is conveyed to a site for executing the curing treatment. Since the resin R remains uncured during the conveyance, the disk-shaped substrate DP is normally carried by either of a method which conveys the disk-shaped substrate DP by sucking an uncoated area (area adjacent to the central mounting hole MH) thereof which was covered by the disk-shaped member DI by a suction device (not shown) and a method which conveys the disk-shaped substrate DP by making use of the central mounting hole MH by a mechanical chuck (not shown).

However, in the above described method of manufacturing an optical recording medium, since maintenance of the disk-shaped member DI to use (e.g. cleaning of the disk-shaped member DI having the resin R stuck thereto) is troublesome, the present inventors developed a method of manufacturing an optical recording medium using an intermediate therefor which is not formed with a central mounting hole MH in its central portion. In this method, first, an intermediate ME, shown in FIG. 12, for a disk-shaped substrate, is prepared by the same method as employed in manufacturing the disk-shaped substrate DP. In this step, a central mounting hole MH is not formed through the intermediate ME, but fine protrusions/depressions (not shown) such as grooves are formed in one surface (upper surface as viewed in the figure) thereof, and an annular projection SR is formed on the lower surface (lower surface as viewed in the figure), similarly to the disk-shaped substrate DP. Then, various functional layers (reflection layer, recording layer, protective layer, etc.) are sequentially formed in a recording area RA of the one surface of the intermediate ME. When the spin coating method is employed to apply resin R to the intermediate ME for formation of each of the functional layers, the resin R is dropped from a nozzle NZ onto the central portion of the intermediate for spin coating, as shown in FIG. 12, so that a layer of the resin R is coated which has a substantially uniform thickness in radial directions, as shown in FIG. 13. Thereafter, the central portion of the intermediate ME having all the functional layers (hereinafter collectively referred to as "the layer FL") formed on the one surface thereof is blanked by presswork to form a central mounting hole MH. Thus, an optical recording medium 1 having the central portion thereof formed with the central mounting hole MH, as shown in FIG. 1, is completed. According to this method of manufacturing an optical recording medium, since the disk-shaped member DI is not used for performing spin coating, it is possible to dispense with troublesome maintenance of the disk-shaped member DI.

DISCLOSURE OF THE INVENTION

From the study of the above described method of manufacturing an optical recording medium, the present inventors found out the following problems to be solved: In the manufacturing method, the intermediate ME without the central mounting hole MH is prepared, and then the layer FL is formed on the intermediate ME, whereafter the central mounting hole MH is formed by presswork. Therefore, in the step of forming functional layers by the spin coating method, since the central mounting hole MH is not yet formed in the central portion of the intermediate ME when the intermediate ME coated with uncured resin R is to be conveyed to the site for carrying out the curing treatment, it is impossible to use the aforementioned mechanical chuck. Further, since the area that is not coated with the resin R does not exist on the intermediate ME, it is also impossible to use the aforementioned suction device. In this case, a method can be contemplated, for example, which uses a device additionally provided for partially curing the resin R to cure part of the resin R on the central portion of the intermediate ME, for allowing the suction device to suck the cured portion. However, this method raises a problem to be solved that it newly requires the cost of the device for partially curing the resin R. Further, the method raises another problem to be solved that since the step of partially curing the resin R is added, manufacturing time is increased, causing reduced production of optical recording media 1 per unit time, resulting in an increase in manufacturing costs.

Further, in this method of manufacturing an optical recording medium, since the central mounting hole MH is not formed until the presswork is completed in a final step, it is impossible to use the stacker 51 conventionally used, for storing prepared intermediates ME or holding intermediates ME having passed through one processing step until the succeeding processing step starts. In such a case, as another method of storing the intermediates ME, a method can be contemplated which uses a stacker 61 having a plurality of stack poles 61*a* (three stack poles 61*a* in the illustrated example) erected on the same circumference as shown in FIG. 14 to store intermediates ME therein in a stacked manner. In this case, the intermediates ME held within the stack poles 61*a*, 61*a*, and 61*a* have respective outer peripheral edges thereof supported by the stack poles 61*a*, 61*a*, and 61*a*. Although not shown, another method can be contemplated which uses a storage case having a plurality of grooves formed therein at equal space intervals, each for receiving the outer peripheral edge of an intermediate ME, to store intermediates ME in a vertical position in parallel with each other in the side-by-side arrangement. In the former storing method, however, since each intermediate ME has its outer peripheral edge supported only by the stack poles 61*a*, 61*a*, and 61*a*, when vibrations are applied to a plurality of intermediates ME stacked one upon another, the intermediates ME easily lose their balance and are tilted as shown in FIG. 15. This raises a problem to be solved. In the latter storing method, the area occupied by the storage case is laterally increased in accordance with an increase in the number of stored intermediates ME, and hence in comparison with the storing method using the stackers 51 and 61, it is difficult to allocate enough space for the storage case when the number of intermediates ME to be stored is large. This also raises a problem to be solved.

The present invention has been made to solve the above described problems, and it is a main object thereof to provide an intermediate for an optical recording medium, which can be uniformly coated with resin by the spin coating method without using a disk-shaped member, stored in a stable state while saving space, and conveyed by an existing conveyor device even when the resin applied thereto remains uncured. Further, it is a main object thereof to provide a method of manufacturing an optical recording medium which can be uniformly coated with resin by the spin coating method without using a disk-shaped member, and conveyed by an existing conveyor device even when the resin applied thereto remains uncured.

The intermediate for an optical recording medium, according to the present invention has a central mounting hole formed in a central portion thereof and one or more kinds of functional layers formed on a surface thereof, for enabling at least one of information recording and information reproduction, the intermediate being produced beforehand for manufacturing the optical recording medium, wherein the intermediate has a provisional central hole smaller in diameter than the central mounting hole formed in a central portion thereof.

According to this intermediate for an optical recording medium, a provisional central hole having a diameter smaller than that of a central mounting hole formed in the optical recording medium is formed in the central portion of the intermediate, whereby in performing spin coating, it is possible to drop resin in the vicinity of the center of the intermediate without using a disk-shaped member, so that a layer of the resin having a substantially uniform thickness can be formed. This makes it possible to dispense with the disk-shaped member, and therefore, unnecessary to carry out maintenance, such as cleaning, of the same, so that costs of manufacturing and maintaining the disk-shaped member can be eliminated. Further, by making use of the provisional central hole, it is possible to hold the intermediate using a mechanical chuck conventionally in general use. Therefore, it is possible to avoid introduction of any new apparatus for conveying intermediates, so that it is possible to cut expenditures in plant and equipment.

In this case, it is preferred that the provisional central hole is formed to have an inner diameter not smaller than 2 mm, and it is more preferred that the same is formed to have an inner diameter not smaller than 3 mm. This construction makes it possible to set the board thickness of chucks of a mechanical chuck for use in conveying the intermediates and the diameter of a stack pole of a stacker for use in storing the intermediates to respective sizes that ensure a minimum strength required for holding the intermediates.

It is also preferable that a hollow cylindrical portion having an outer diameter smaller than the diameter of the central mounting hole and an inner diameter not smaller than a diameter of the provisional central hole, and having a central axis thereof aligned with a center of the provisional central hole, is formed on a surface on which the functional layers are to be formed, in a manner protruding therefrom. This construction makes it possible to drop the resin along the outer peripheral surface of the hollow cylindrical portion, thereby supplying the required amount of resin at a location closer to the center of the intermediate than a location away therefrom by the diameter of the central mounting hole without letting the resin enter the provisional central hole. Therefore, the thickness distribution of the layer of the resin formed by the spin coating method can be made more uniform.

In this case, it is preferred that the hollow cylindrical portion is formed to have an outer diameter not larger than 10 mm, and it is more preferred that the hollow cylindrical portion is formed to have an outer diameter not larger than 7 mm. If the outer diameter of the hollow cylindrical portion is set to not larger than 10 mm, when resin is applied by the spin coating method, it is possible to apply the resin substantially uniformly by holding variation in the thickness of the layer of the resin in the recording area of the intermediate e.g. within approximately 5 μm. Further, by setting the outer diameter of the hollow cylindrical portion to not larger than 7 mm, it is possible to form a more uniform resin film by holding variation in the thickness of the applied resin e.g. within approximately 3 μm.

It is also preferred that the hollow cylindrical portion is formed such that a length of protrusion thereof from the surface on which the functional layers are to be formed is not smaller than 0.5 mm, and more preferably not smaller than 1.0 mm. Due to this construction, when spin coating is performed, it is possible to drop a required amount of resin, and prevent the dropped resin from entering the provisional central hole, thereby reducing variation in the thickness of the resin to form a uniformly coated resin layer. Further, it is preferred that the hollow cylindrical portion is formed such that the inner diameter thereof is equal to the diameter of the provisional central hole. Due to this construction, it is possible to bring the chucks of the mechanical chuck into contact not only with the inner surface of the provisional central hole, but also with the inner surface of the hollow cylindrical portion. This makes it possible to increase the contact area between the surfaces of the chucks and the intermediate and increase the frictional force generated between the surfaces of the chucks and the intermediate, so that the holding of the intermediate by the mechanical chuck can be made stable.

A method of manufacturing an optical recording medium, according to the present invention, comprises, when an optical recording medium is manufactured which has a central mounting hole formed in a central portion thereof and one or more kinds of functional layers formed on a surface thereof, for enabling at least one of information recording and information reproduction, at least the steps of an intermediate-preparing step of preparing any one of the aforementioned intermediates by resin molding, a functional layer-forming step of forming the functional layers on the surface of the prepared intermediate, and a central hole-forming step of forming the central mounting hole through the intermediate having the one or more kinds of functional layers formed thereon.

According to this method of manufacturing an optical recording medium, the optical recording medium is manufactured by performing the intermediate-preparing step of preparing any one of the aforementioned intermediates by resin molding, the functional layer-forming step of forming the functional layers on the surface of the prepared intermediate, and the central hole-forming step of forming the central mounting hole through the intermediate having all the functional layers formed thereon. Therefore, in performing spin coating, it is possible to drop resin in the vicinity of the center of the intermediate without using a disk-shaped member, so that a layer of the applied resin can be made substantially uniform in thickness. This method makes it possible to dispense with the disk-shaped member, and therefore, unnecessary to carry out maintenance, such as cleaning, of the same, so that costs of manufacturing and maintaining the disk-shaped member can be eliminated. Further, by making use of the provisional central hole, it is possible to hold the intermediate using the mechanical chuck conventionally in general use. Therefore, it is possible to avoid introduction of any new apparatus for conveying intermediates, and therefore, it is possible to cut expenditures in plant and equipment.

It should be noted that the present disclosure relates to the subject matter included in Japanese Patent Application No. 2002-196644 filed Jul. 5, 2002, and it is apparent that all the disclosures therein are incorporated herein by reference.

BRIEF DESCRIPTION OF DRAWINGS

FIG. 15 is a side cross-sectional view showing the intermediates ME stacked on the stacker 61 which have lost their balance and tilted due to vibrations or the like.

BEST MODE FOR CARRYING OUT THE INVENTION

Figure 1:
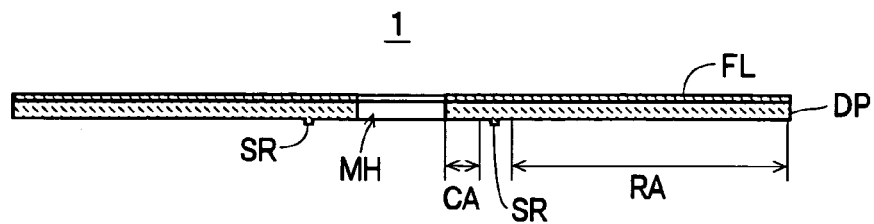
FIG. 1 is a side cross-sectional view showing the construction of an optical recording medium 1 manufactured by using an intermediate ME1 according to an embodiment of the present invention.

Hereinafter, a preferred embodiment of an intermediate for an optical recording medium and a method of manufacturing the optical recording medium, according to the present invention, will be described with reference to the accompanying drawings. It should be noted that component elements identical in construction to those of the optical recording medium 1 and the intermediate ME are designated by identical reference numerals and duplicate description thereof will be omitted.

First, the construction of the optical recording medium 1 manufactured by the method of manufacturing the optical recording medium according to the present invention will be described with reference to FIG. 1.

The optical recording medium 1 is formed by forming a layer FL on one surface (upper surface, as viewed in the figure) of a disk-shaped substrate DP. In this case, the disk-shaped substrate DP is formed e.g. of a transparent resin (polycarbonate, for example) and has a disk shape with a thickness of approximately 1.1 mm and a diameter of approximately 120 mm. The disk-shaped substrate DP has a central portion thereof formed with a central mounting hole MH having a diameter of approximately 15 mm, and within a recording area RA on the one surface of the disk-shaped substrate DP, there are formed fine protrusions/depressions, such as grooves. Further, on the other surface (lower surface, as viewed in the figure) of the disk-shaped substrate DP, there is formed an annular projection SR having a diameter of approximately 38 mm. The layer FL is comprised of various functional layers, such as a reflection layer, a recording layer, and a protective layer (cover layer), sequentially deposited from the disk-shaped substrate DP side in the mentioned order. The layer FL has a thickness of approximately 0.1 mm in total. In this case, at least the protective layer formed of resin (light-transmitting resin) coated all over the one surface of the disk-shaped substrate DP is a functional layer formed by the spin coating method, while the reflection layer formed of Ag, Au, Al, or the like within the recording area RA is a functional layer formed by the sputtering method. Further, when a phase change material is used to form the recording layer, the recording layer is also a functional layer formed by the sputtering method.

Next, description will be given of the method of manufacturing the optical recording medium 1.

Figure 2:
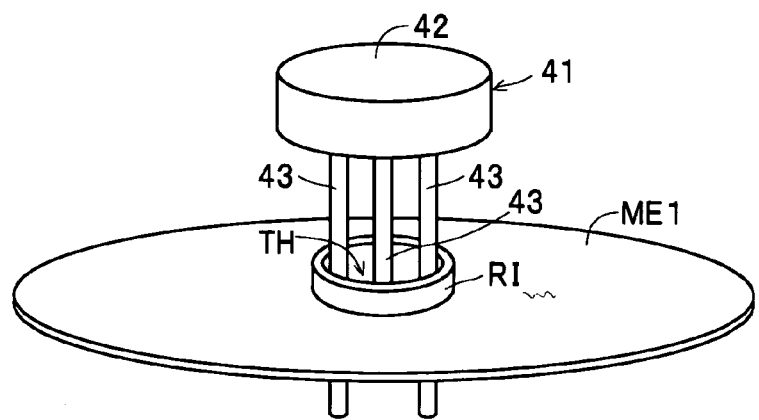
FIG. 2 is a perspective view useful in explaining a method of conveying the intermediate ME1 using a mechanical chuck 41.
Figure 3:
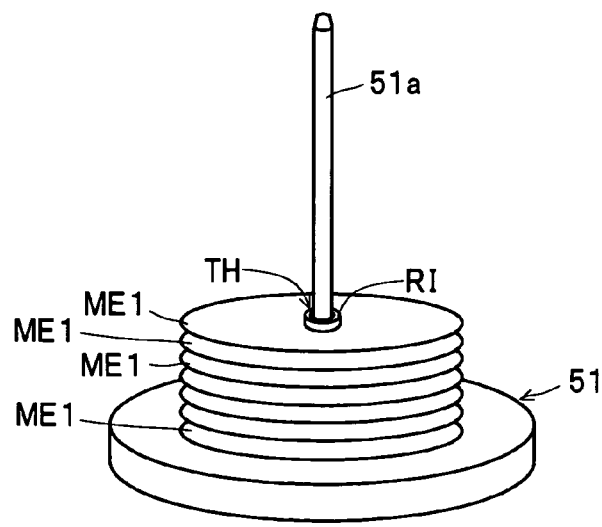
FIG. 3 is a perspective view useful in explaining a method of storing intermediates ME1 using a stacker 51.
Figure 4:
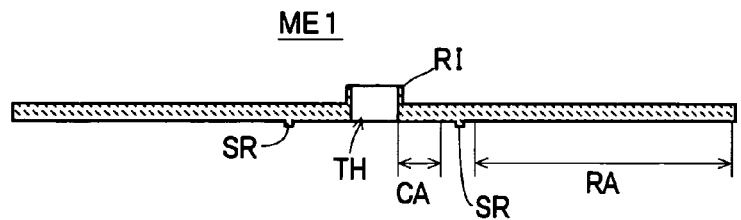
FIG. 4 is a side cross-sectional view of the intermediate ME1 according to the embodiment of the present invention.

First, a stamper (not shown) having a pattern for forming fine protrusions/depressions, such as grooves, formed on a surface thereof, is set in a mold assembly (not shown), and a resin is injected into a cavity of the mold assembly to thereby mold an intermediate ME1 (intermediate-preparing step). In this case, as shown in FIG. 4, the intermediate ME1 is formed of a transparent resin (polycarbonate, for example) and has a disk shape with a thickness of approximately 1.1 mm and a diameter of approximately 120 mm. The intermediate ME1 has a central portion thereof formed with a provisional central hole TH smaller in diameter than the central mounting hole MH of the optical recording medium 1. The provisional central hole TH is used, as shown in FIG. 2, for inserting chucks 43, 43, and 43 of a mechanical chuck 41 therethrough for conveyance of the intermediate ME1. The provisional central hole TH is also used, as shown in FIG. 3, for inserting a stack pole 51a of a stacker 51 therethrough for placing the intermediate ME1 on the stacker 51 for storage. It should be noted that the diameter of the stack pole 51a is set to be slightly smaller than that of the provisional central hole TH. In this case, when the strengths of the chucks 43 and the stack pole 51a are considered, reduction of the sizes and diameters of these is inevitably limited. Therefore, the diameter of the provisional central hole TH is set to not smaller than 2 mm, and preferably not smaller than 3 mm. In the intermediate ME1 according to the present embodiment, the diameter of the provisional central hole TH is set to 4 mm, by way of example.

Further, as shown in FIG. 2, on one surface of the intermediate ME1, there is formed a hollow cylindrical portion RI, and the central axis of the hollow cylindrical portion RI is configured to be aligned with the center of (coaxial with) the provisional central hole TH. In the present embodiment, the hollow cylindrical portion RI has an inner diameter thereof set to be equal to the diameter (4 mm) of the provisional central hole TH, and protrudes from the rim of the provisional central hole TH. The hollow cylindrical portion RI is blanked off simultaneously when the central portion of the intermediate ME1 is blanked by presswork to form the central mounting hole MH. Therefore, it is necessary to set the outer diameter of the hollow cylindrical portion RI to be not larger than the diameter of the central mounting hole MH at the maximum (not larger than 15 mm). Further, when a resin R is applied to the one surface of the intermediate ME1 by the spin coating method, it is necessary to drop the resin R from a nozzle NZ onto the vicinity of the outer peripheral surface of the hollow cylindrical portion RI. In doing this, it has been found by experiment that the resin R is required to be dropped within approximately 10 mm of the center of the intermediate ME1 so as to substantially uniformly apply the resin R while holding variation in the thickness of the layer of the resin R at least in the recording area RA, within approximately 5 μm. Further, it has also been found by experiment that it is necessary to drop the resin R within approximately 7 mm of the center of the intermediate ME1, so as to achieve more uniform coating by holding the variation in the thickness of the resin R in the recording area RA within approximately 3 μm. Therefore, the outer diameter of the hollow cylindrical portion RI is set to approximately not larger than 10 mm, and preferably approximately not larger than 7 mm. In the intermediate ME1 according to the present embodiment, the outer diameter of the hollow cylindrical portion RI is set to 6 mm, by way of example.

Further, the length of projection of the hollow cylindrical portion RI from the one surface of the intermediate ME1 is required to be set to not smaller than 0.5 mm so as to allow a required amount of resin R to be dropped as well as to prevent the dropped resin R from entering the provisional central hole TH, while suppressing the variation in the thickness of the resin R in the recording area RA. When a margin of safety is taken into account, the length of projection of the hollow cylindrical portion RI is preferably set to not smaller than 1 mm. In the intermediate ME1 according to the present embodiment, the length of projection of the hollow cylindrical portion RI is set to 2 mm, by way of example.

The other part of the intermediate ME1 than the central portion to be blanked by presswork is identical in construction to the corresponding part of the optical recording medium 1. Therefore, within the recording area RA on the one surface of the intermediate ME1, there are formed fine protrusions/depressions, such as grooves. Further, on the other surface of the intermediate ME1, an annular projection SR is formed. Intermediates ME1 molded as above are stored in a state vertically stacked one upon another, as shown in FIG. 3, using the stacker 51. In this case, in the stored state of the intermediates ME1, a longer one of the hollow cylindrical portion RI and the annular projection SR of each intermediate ME1 is in abutment with the upper or lower surface of an adjacent intermediate ME1, whereby a space is formed between each adjacent two of the intermediates ME1.

Figure 5:
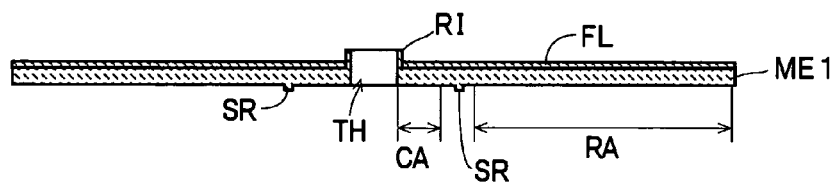
FIG. 5 is a side cross-sectional view showing the FIG. 4 intermediate ME1 having a layer FL formed thereon.
Figure 6:
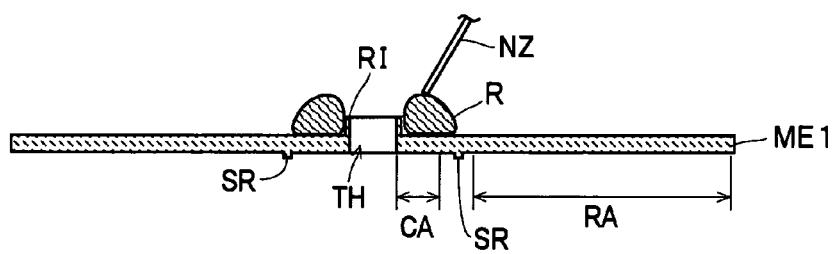
FIG. 6 is a side cross-sectional view showing the FIG. 4 intermediate ME1 having resin R dropped thereon.

Then, as shown in FIG. 5, the layer FL comprised of a plurality of functional layers is formed on the one surface of the intermediate ME1 by the sputtering method and the spin coating method (functional layer-forming step). In this step, a functional layer formed by the sputtering method (e.g. the reflection layer, or the recording layer formed of a phase change material) is formed within the recording area RA using an inner peripheral mask and an outer peripheral mask. It should be noted that it is also possible to form a functional layer on a portion radially inward of the recording area RA by the sputtering method using an inner peripheral mask with a reduced diameter. On the other hand, a functional layer formed by the spin coating method (e.g. the protective layer) is formed by dropping the resin R directly from the nozzle NZ onto the vicinity of the outer peripheral surface of the hollow cylindrical portion RI, as shown in FIG. 6, and then spreading (drawing) the resin R to the outer periphery of the intermediate ME1 by spinning the intermediate ME1, and curing the spread resin R. In this case, since the outer diameter of the hollow cylindrical portion RI is set to approximately not larger than 10 mm, it is possible to drop the resin R onto an area close to the center of the intermediate ME1 without using a disk-shaped member DI. In addition, it is possible to drop the required amount of resin R while preventing the dropped resin R from entering the provisional central hole TH by the hollow cylindrical portion RI. By thus dropping the required amount of resin R onto the area close to the center of the intermediate ME1, the functional layer can be formed by the spin coating method such that the layer thickness distribution of the resin R is substantially uniform. When the intermediate ME1 coated with the resin R is conveyed to a site where the next step (curing treatment) is to be executed, the intermediate ME1 is held by the mechanical chuck 41 shown in FIG. 2 for conveyance.

Figure 7:
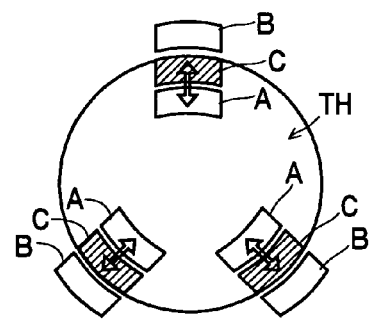
FIG. 7 is a diagram useful in explaining an intermediate-holding operation by the mechanical chuck 41.

In this case, e.g. as shown in FIG. 2, the mechanical chuck 41 is comprised of an actuator 42 and the three chucks 43, 43, and 43 each extending downward from the lower surface of the actuator 42. In the illustrated example, the chucks 43, 43, and 43 are arranged at equal space intervals along the same circumference, and each of the chucks 43, 43, and 43 has an upper end thereof attached to the actuator 42 in a manner pivotally movable in a radial direction. The actuator 42 has a capability of pivotally moving each of the chucks 43, 43, and 43 with the upper end thereof as a pivot to thereby move the chucks 43, 43, and 43, as shown in FIG. 7, between a diametrically reduced state (shown as "A" in the figure), in which they are on a circle smaller in diameter than that of the provisional central hole TH, and a diametrically expanded state (shown as "B" in the figure), in which they are on a circle larger than that of the provisional central hole TH.

Next, a description will be given of the operation of the mechanical chuck 41. In the mechanical chuck 41, first, as shown in FIG. 2, the chucks 43, 43, and 43 in the diametrically reduced state are inserted into the provisional central hole TH. Then, the chucks 43, 43, and 43 are pivotally moved toward the diametrically expanded state by the actuator 42. At this time, although the chucks 43, 43, and 43 are restricted from moving outward at a time point (position shown as "C" in FIG. 7) at which the chucks 43, 43, and 43 are brought into abutment with an inner surface of the provisional central hole TH, they continue to press the inner surface of the provisional central hole TH, due to driving forces continuously applied thereto for outwardly driving them by the actuator 42. Therefore, the mechanical chuck 41 holds the intermediate ME1 such that it can convey the intermediate ME1 without dropping the same, by frictional force generated between the surfaces of the chucks 43, 43, and 43 and the inner surface of the provisional central hole TH. Therefore, so as to continue holding the intermediate ME1 reliably and stably by the mechanical chuck 41 even if an external force, such as vibrations or the like, is applied to the mechanical chuck 41 or the intermediate ME1, it is preferable to increase a contact area between the surfaces of the chucks 43, 43, and 43, and the inner surface of the provisional central hole TH. In this regard, in the intermediate ME1, the diameter of the provisional central hole TH and the inner diameter of the hollow cylindrical portion RI are set to be equal to each other, so that the chucks 43, 43, and 43 are brought into contact not only with the inner surface of the provisional central hole TH but also with the inner surface of the hollow cylindrical portion RI. This increases the contact area between the chucks 43, 43, and 43 and the intermediate ME1 to increase the frictional force generated between the surfaces of the chucks 43, 43, and 43 and the intermediate ME1. Therefore, even if an external force, such as vibrations, is applied to the mechanical chuck 41 or the intermediate ME1, the intermediate ME1 continues to be held reliably in a more stable state. Meanwhile, to release the intermediate ME1, in the mechanical chuck 41, the actuator 42 pivotally moves the chucks 43, 43, and 43 from the diametrically expanded state to the diametrically reduced state. This causes the intermediate ME1 to be released from the chucks 43, 43, and 43.

Then, the central portion of the intermediate ME1 and the layer FL formed on the one surface of the intermediate ME1 (within approximately 15 mm diameter having the central axis of the intermediate ME1 in the center) is blanked (central hole-forming step). By this blanking operation, the hollow cylindrical portion RI and the provisional central hole TH are removed, and simultaneously, a central mounting hole MH is newly formed, whereby the optical recording medium 1 shown in FIG. 1 is manufactured.

As described above, according to the intermediate ME1 for the disk-shaped substrate DP, since it has the central portion thereof formed with the provisional central hole TH smaller in diameter than the central mounting hole MH, it is possible to drop the resin R onto the vicinity of the center of the intermediate ME1 without using the disk-shaped member DI, so that a layer of the resin R can be formed by the spin coating method such that the layer has a substantially uniform thickness. Further, by making use of the provisional central hole TH, it is possible to positively hold the intermediate ME1 by the mechanical chuck 41 conventionally in general use. Furthermore, the hollow cylindrical portion RI having the outer diameter smaller than the diameter of the central mounting hole MH and the inner diameter not smaller than the diameter of the provisional central hole TH is formed on the surface on which the layer FL is to be formed, in a protruding manner such that the central axis of the hollow cylindrical portion RI is aligned with the center of the provisional central hole TH, whereby it is possible to drop the resin R along the outer peripheral surface of the hollow cylindrical portion RI. This makes it possible to apply the required amount of resin R at a location closer to the center of the intermediate ME1 than a location away therefrom by the diameter of the central mounting hole MH without letting the resin R enter the provisional central hole TH. Therefore, the thickness distribution of the layer of the resin R formed by the spin coating method can be made more uniform. Moreover, by setting the inner diameter of the hollow cylindrical portion RI equal to the diameter of the provisional central hole TH, the chucks 43, 43, and 43 can be brought into contact not only with the inner surface of the provisional central hole TH, but also with the inner surface of the hollow cylindrical portion RI. This makes it possible to increase the contact area between the chucks 43, 43, and 43 and the intermediate ME1 to increase the frictional force generated between the surfaces of the chucks 43, 43, and 43 and the intermediate ME1, so that it is possible to continue holding the intermediate ME1 stably by the mechanical chuck 41 even when an increased external force due to vibrations or the like is applied to the mechanical chuck 41 or the intermediate ME1.

Figure 8:
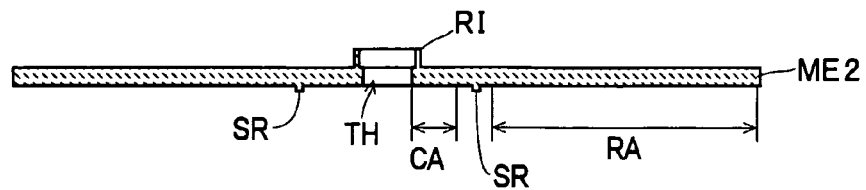
FIG. 8 is a side cross-sectional view of another intermediate ME2 according to the embodiment of the present invention.
Figure 9:
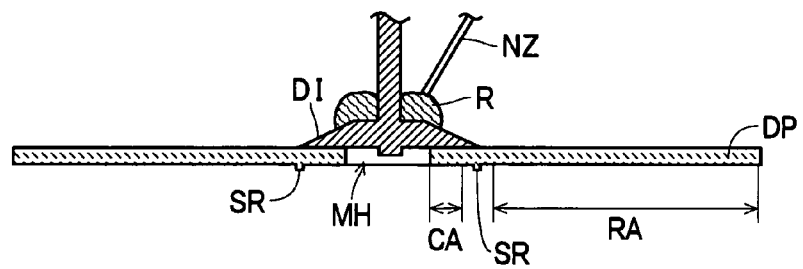
FIG. 9 is a side cross-sectional view of a disk-shaped substrate DP with a disk-shaped member DI placed thereon and resin R dropped on the disk-shaped member.
Figure 10:
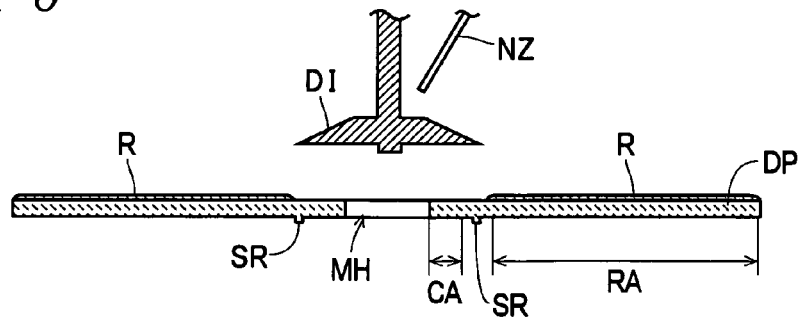
FIG. 10 is a side cross-sectional view of the FIG. 9 disk-shaped substrate DP having a layer of the resin R formed thereon by the spin coating method.
Figure 11:
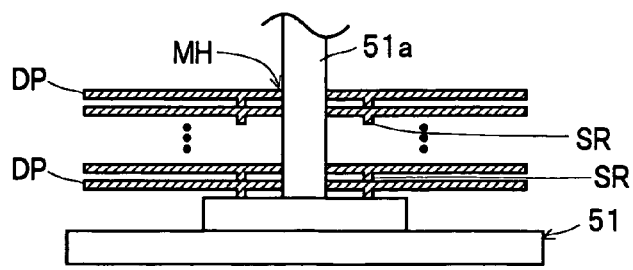
FIG. 11 is a cross-sectional view showing a state of disk-shaped substrates DP being stored on the stacker 51.
Figure 12:
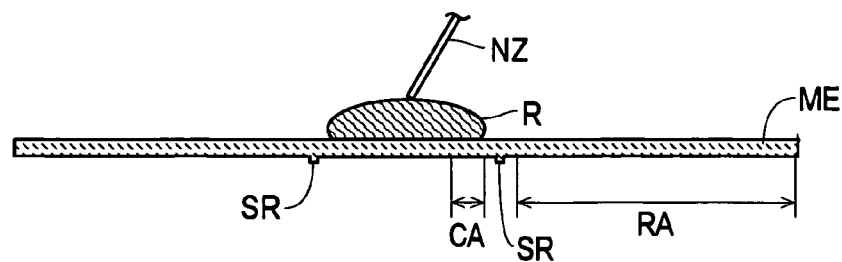
FIG. 12 is a side cross-sectional view useful in explaining a method of manufacturing the optical recording medium 1 by using another intermediate ME developed by the present inventors, and showing the intermediate ME having the resin R applied to a central portion thereof.
Figure 13:
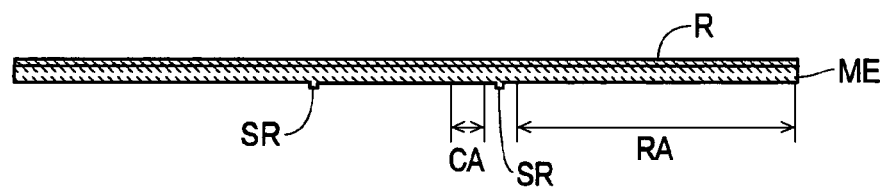
FIG. 13 is a side cross-sectional view of the FIG. 12 intermediate ME coated with the resin R by the spin coating method.
Figure 14:
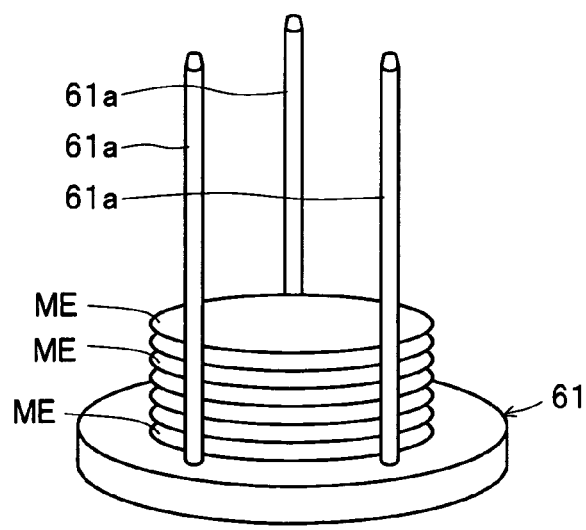
FIG. 14 is a perspective view of intermediates ME in a state stored on a stacker 61.

It should be noted that the present invention is by no means limited to the above embodiment, but it can be modified as required. For example, although in the above described embodiment, the optical recording medium is manufactured by sequentially forming functional layers, such as a reflection layer, a recording layer, and a protective layer, in the mentioned order, from the intermediate ME1 side, this is not limitative, but it is also possible to manufacture the optical recording medium by sequentially forming functional layers, such as a recording layer, a reflection layer, and a protective layer in the mentioned order, from the intermediate ME1 side. Further, the functional layer formed by the spin coating method described above includes not only the protective layer but also a recording layer formed e.g. of a pigment. Further, although in the above described embodiment, the inner diameter of the hollow cylindrical portion RI is set to be equal to the diameter of the provisional central hole TH, the inner diameter of the hollow cylindrical portion RI can be formed to be larger than the diameter of the provisional central hole TH, as shown in FIG. 8, so long as it is possible to hold an intermediate ME2 sufficiently with the frictional force generated between the surfaces of the chucks 43, 43, and 43 and the inner surface of the provisional central hole TH. Further, although in the above described embodiment, the intermediate ME1 is provided with the hollow cylindrical portion RI, it is also possible to employ a construction in which the intermediate ME1 is provided with the provisional central hole TH alone. However, to drop the required amount of resin R onto an area closer to the center of the intermediate ME1 while preventing the dropped resin R from entering the provisional central hole TH, it is preferable to provide the hollow cylindrical portion RI.

INDUSTRIAL APPLICABILITY

As described hereinabove, according to the intermediate for an optical recording medium, a provisional central hole smaller in diameter than a central mounting hole formed in the optical recording medium is formed in the central portion of the intermediate, whereby in performing spin coating, it is possible to drop resin in the vicinity of the center of the intermediate without using a disk-shaped member, so that a layer of applied resin can be made substantially uniform in thickness. This makes it possible to dispense with the disk-shaped member in manufacturing the optical recording medium, and therefore, unnecessary to carry out maintenance, such as cleaning, of the disk-shaped member. Thus, there is realized an intermediate for an optical recording medium, which is capable of eliminating costs of manufacturing and maintaining the disk-shaped member. Further, by making use of the provisional central hole, it is possible to hold the intermediate using a mechanical chuck conventionally in general use. This makes it possible to avoid introduction of any new apparatus for conveying intermediates, thereby realizing an intermediate for an optical recording medium, which is capable of cutting expenditures in plant and equipment.

The invention claimed is:

1. An intermediate for an optical recording medium that has a central mounting hole formed in a central portion thereof and one or more kinds of functional layers formed on a surface thereof, for enabling at least one of information recording and information reproduction, the intermediate being produced beforehand for manufacturing the optical recording medium,
    wherein the intermediate has a provisional central hole formed in a central portion thereof, the provisional central hole being smaller in diameter than the central mounting hole.

2. An intermediate for an optical recording medium, as claimed in claim 1,
    wherein the provisional central hole is formed to have an inner diameter not smaller than 2 mm.

3. An intermediate for an optical recording medium, as claimed in claim 1,
    wherein a hollow cylindrical portion having an outer diameter smaller than a diameter of the central mounting hole and an inner diameter not smaller than a diameter of the provisional central hole, and having a central axis thereof aligned with a center of the provisional central hole, is formed on a surface on which the functional layers are to be formed, in a manner protruding therefrom.

4. An intermediate for an optical recording medium, as claimed in claim 3,
    wherein said hollow cylindrical portion is formed to have an outer diameter not larger than 10 mm.

5. An intermediate for an optical recording medium, as claimed in claim 3,
    wherein said hollow cylindrical portion is formed such that a length of protrusion thereof from the surface on which the functional layers are to be formed is not smaller than 0.5 mm.

6. An intermediate for an optical recording medium, as claimed in claim 3,
    wherein said hollow cylindrical portion is formed such that the inner diameter thereof is equal to the diameter of the provisional central hole.

7. A method of manufacturing an optical recording medium, comprises, when an optical recording medium is manufactured which has a central mounting hole formed in a central portion thereof and one or more kinds of functional layers formed on a surface thereof, for enabling at least one of information recording and information reproduction, at least the steps of:
    an intermediate-preparing step of preparing an intermediate as claimed in claim 1 by resin molding;
    a functional layer-forming step of forming the functional layers on the surface of the prepared intermediate; and
    a central hole-forming step of forming the central mounting hole through the intermediate having the one or more kinds of functional layers formed thereon.

* * * * *